United States Patent
Sivan et al.

(10) Patent No.: US 10,320,881 B2
(45) Date of Patent: Jun. 11, 2019

(54) OPERATING SYSTEM FINGERPRINT DETECTION

(71) Applicant: CRONUS CYBER TECHNOLOGIES LTD., Haifa (IL)

(72) Inventors: Doron Sivan, Haifa (IL); Matan Michael Azugi, Kiryat Motzkin (IL)

(73) Assignee: Cronus Cyber Technologies Ltd., Haifa (IL)

( * ) Notice: Subject to any disclaimer, the term of this patent is extended or adjusted under 35 U.S.C. 154(b) by 51 days.

(21) Appl. No.: 15/534,226

(22) PCT Filed: Dec. 9, 2015

(86) PCT No.: PCT/IL2015/051195
§ 371 (c)(1),
(2) Date: Jun. 8, 2017

(87) PCT Pub. No.: WO2016/092548
PCT Pub. Date: Jun. 16, 2016

(65) Prior Publication Data
US 2017/0366600 A1 Dec. 21, 2017

Related U.S. Application Data

(60) Provisional application No. 62/089,292, filed on Dec. 9, 2014.

(51) Int. Cl.
*H04L 29/08* (2006.01)
*H04L 29/06* (2006.01)

(52) U.S. Cl.
CPC ............ *H04L 67/025* (2013.01); *H04L 67/04* (2013.01); *H04L 69/16* (2013.01); *H04L 69/22* (2013.01); *H04L 63/08* (2013.01)

(58) Field of Classification Search
None
See application file for complete search history.

(56) References Cited

U.S. PATENT DOCUMENTS 7,073,198 B1 7/2006 Flowers et al.
7,519,954 B1 * 4/2009 Beddoe ............... H04L 63/1433
709/224

(Continued)

FOREIGN PATENT DOCUMENTS

CN 103746826 A 4/2014

*Primary Examiner* — Jeffrey R Swearingen
(74) *Attorney, Agent, or Firm* — William Dippert; Laurence Greenberg; Werner Stemer

(57) ABSTRACT

One primary aspect of the present disclosure is a method of remotely identifying operating system of a remote network element, wherein the remote network element has a plurality of ports and an Internet connection, the method comprising: scanning the ports of the remote network element for determining which ports are open of the plurality of ports; sending, by a processor, a sequence of packets to the remote network element over the internet, and wherein packets in the sequence of packets are different from one another; receiving reply-packets from the remote network element, wherein the reply-packets are the reply of the remote network element to the packets, and analyzing a signature of the reply-packets; and identifying the operating system of remote network element by comparing the signature with documented signatures of existing operating systems.

6 Claims, 3 Drawing Sheets

(56) References Cited

U.S. PATENT DOCUMENTS

| | | | |
|---|---|---|---|
| 7,680,929 B1 | 3/2010 | Lyon | |
| 8,458,308 B1* | 6/2013 | Steves | G06F 17/30386 709/223 |
| 8,635,697 B2* | 1/2014 | McNamee | G06F 21/554 709/224 |
| 2007/0297349 A1 | 12/2007 | Arkin | |
| 2008/0181215 A1 | 7/2008 | Bollich et al. | |
| 2009/0182864 A1* | 7/2009 | Khan | H04L 29/12509 709/224 |
| 2011/0314142 A1* | 12/2011 | Newton | G06Q 30/0201 709/224 |
| 2012/0151594 A1 | 6/2012 | McClure et al. | |
| 2012/0198048 A1* | 8/2012 | Ioffe | H04L 43/028 709/224 |

* cited by examiner

OPERATING SYSTEM FINGERPRINT DETECTION

CROSS-REFERENCE TO RELATED PATENT APPLICATIONS

This patent application is a U.S. National Phase filing under 35 U.S.C. § 371 of PCT Patent Application No. PCT/IL2015/051195, filed Dec. 9, 2015, which in turn is based upon and claims the benefit of the filing date of U.S. Provisional Patent Application Ser. No. 62/089,292, filed Dec. 9, 2014, each of which is incorporated herein by reference in its entirety.

FIELD OF THE INVENTION

The present invention relates to operating system identification. More particularly, the present invention relates to an improved method for operating system fingerprint detection.

BACKGROUND OF THE INVENTION

Operating System (OS) fingerprinting is the procedure of determining the operating system of any IP based system. This can be accomplished passively by "sniffing" (analyzing and intercepting passing log traffic) of network packets traveling between hosts, actively by sending carefully crafted packets to the target machine and analyzing the response, or through non-technical means. OS fingerprinting is typically used by security professionals (known as "white-hats") and hackers (known as "black-hats") alike for mapping of remote networks and determination of vulnerabilities that might be present to exploit.

Remote OS fingerprinting is a recent development, with the ability to remotely determine with high accuracy, the operating system of a any IP based system. The implications of this technology are perhaps not yet fully understood; however, it is seen as enough of a threat that strategies are currently being developed to prevent and spoof OS fingerprints.

The ease with which exploit tools can be scripted and used en masse to find vulnerable hosts largely trivializes the benefits of OS obscurity in today's world. This may change over the coming years as the larger software companies put an emphasis on network security and more specialized attacks are required to exploit systems. The general trend towards increasing penalties for getting caught as the world's cyber laws improve may also serve as a driver towards more refined attacks in the future.

The following is an overview of different approaches to OS fingerprinting, and some currently available tools:

SUMMARY OF THE INVENTION

One primary aspect of the present disclosure is a method of remotely identifying operating system of a remote network element, wherein the remote network element has a plurality of ports and an Internet connection, the method comprising: scanning the ports of the remote network element for determining which ports are open of the plurality of ports; sending, by a processor, a sequence of packets to the remote network element over the internet, and wherein packets in the sequence of packets are different from one another; receiving reply-packets from the remote network element, wherein the reply-packets are the reply of the remote network element to the packets, and analyzing a signature of the reply-packets; and identifying the operating system of the remote network element by comparing the signature with documented signatures of existing operating systems.

In some exemplary embodiments the documented signatures of existing operating systems are stored in a data repository.

In some exemplary embodiments the sequence of packets and the reply packets are selected from the group comprising of: Internet Control Message Protocol (ICMP); Transmission Control Protocol (TCP); and User Datagram Protocol (UDP), wherein the packets further comprising flags; arguments; and attributes, In some exemplary embodiments the sequence of packets consisting ten packets: wherein a first packet is a standard ICMP ping packet; and wherein a second packet is a nonstandard ICMP ping packet comprising a nonzero code; a don't fragment flag; and a random type of service value; and wherein a third packet is an ICMP standard time-stamp packet; and wherein a forth packet is an ICMP standard information-request packet; and wherein a fifth packet is an ICMP address-mask request packet; and wherein a sixth packet is a TCP packet comprising at least one option, and an synchronization (SYN) flag, wherein the sixth packet is addressed to an open port of the remote network element; and wherein a seventh packet is a TCP packet comprising at least one option, and a acknowledge (ACK) plus push (PSH) flags, wherein the eighth packet is addressed to an open port of the remote network element; and wherein a eight packet is a TCP packet comprising at least one option and a finished (FIN) flag, wherein the ninth packet is addressed to a closed port of the remote network element; and wherein a ninth packet is a TCP packet comprising at least one option and a FIN plus ACK flags, wherein the ninth packet is addressed to a closed port of the remote network element; and wherein a tenth packet is an UDP packet addressing port zero.

In some exemplary embodiments the sending the sequence of packets is sending the sequence of packets to a plurality of remote network elements in parallel.

In some exemplary embodiments receiving the reply-packets is receiving the reply-packets from a plurality of remote network elements in parallel.

In some exemplary embodiments identifying the operating system of IP base remote network element, further comprises identifying the version of the operating system.

In some exemplary embodiments network element is selected from the group comprising of: computers; smart phones; laptops; handheld computers; printers; and electronic device consisting software operating system.

Classical Fingerprinting

Even without resorting to stealth techniques of any kind, hosts often announce their OS to anyone making a connection to them through the network, using typical "welcome banners" or header information. For example:

When connecting to a host via the standard Telnet protocol, the OS version is often sent to the client as part of a welcome message.

File Transfer Protocols (FTP) also often provide this information either as a welcome banner or if prompted via a system type (SYST) command If a Simple Network Management Protocol (SNMP) service is present on a User Datagram Protocol (UDP/161) machine, it is often left with the default 'public' community name, which allows remote detailed querying of the service and hence host.

Other services that send back 'free' useful information include IMAP, POP2, POP3, SMTP, SSH, NNTP and FINGER. These protocols are reasonably reliable even today and automated tools exist to simplify the process.

Using anonymous FTP accounts (where it is supported), downloading a public binary that is required for FTP to function and examining it to determine what platform it was built for.

A more primitive approach is to port scan the machine and then examine the returned listening ports for patterns common to a particular OS.

Finally, it can be possible to determine the OS of a system by a non-technical solution, such as "social engineering". Learning about the target through phone calls, chatting with the system administrator, or even a public site tour are all possibilities.

Active IP Packet Fingerprinting

This is the predominant form of OS fingerprinting, provoking the target into eliciting a response and analyzing it carefully. A huge amount of information can be recovered from this response to a carefully crafted network packet. The three common IP packet types: Internet Control Message Protocol (ICMP), Transmission Control Protocol (TCP), and the User Datagram Protocol (UDP) are all used in this technique wherein various valid (and invalid) packets are sent to the host to refine the guess of the OS. The most common techniques in use include the following:

FIN Probing—a single packet is sent to a known open port with a FIN flag set. This flag usually signals the end of a communication and as such is not expected without a connection being previously established. The standard behavior is to simply ignore the packet; however, many stacks send a reset (RST) packet back. This difference becomes the means to begin creating a fingerprint.

ICMP Error Message Echo Integrity—ICMP error message packets are required to include some of the original ICMP packet that caused the error. This makes it simple for implementations to use a copy of the original as a template for constructing the reply packet. Using the packet space as a 'scratch' area can leave spurious telltale data that identifies the OS that created it.

ICMP Error Message Type of Service (ToS)—Nearly all implementations return a zero in the ToS field for ICMP port unreachable messages. The Linux operating system, however, currently returns a different value in this field making it easy to broadly identify.

TCP Options—These are enhancements to the TCP protocol to improve performance in unreliable or high latency networks. TCP Options have been added as TCP requests for command (RFC) over time and the patterns of compliance in responses can reveal the underlying OS. Interestingly is not just the number of options a stack supports that can identify it, but also the order in which the options are returned.

IP ID Sampling—Many OSs utilize a system wide counter for IP ID generation. Other, more advanced implementations either randomize this number or set it to 0. Information can be gleaned from the choice of IP ID as to the source OS. Again, predictable IP ID values can have important security implications outside of OS fingerprinting, including completely silent port scanning.

ICMP Timestamp—This is an ICMP packet type, and can be used to determine OS type. It can also be used to determine host uptime if implemented and the update frequency are known.

Fragmentation Handling—Fragmented packets, particularly the handling of packets that contain overlapping fragments, are another source of anomalies Some stacks retain the first version of the overlapped data, and some the second.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF THE INVENTION

Figure 1:
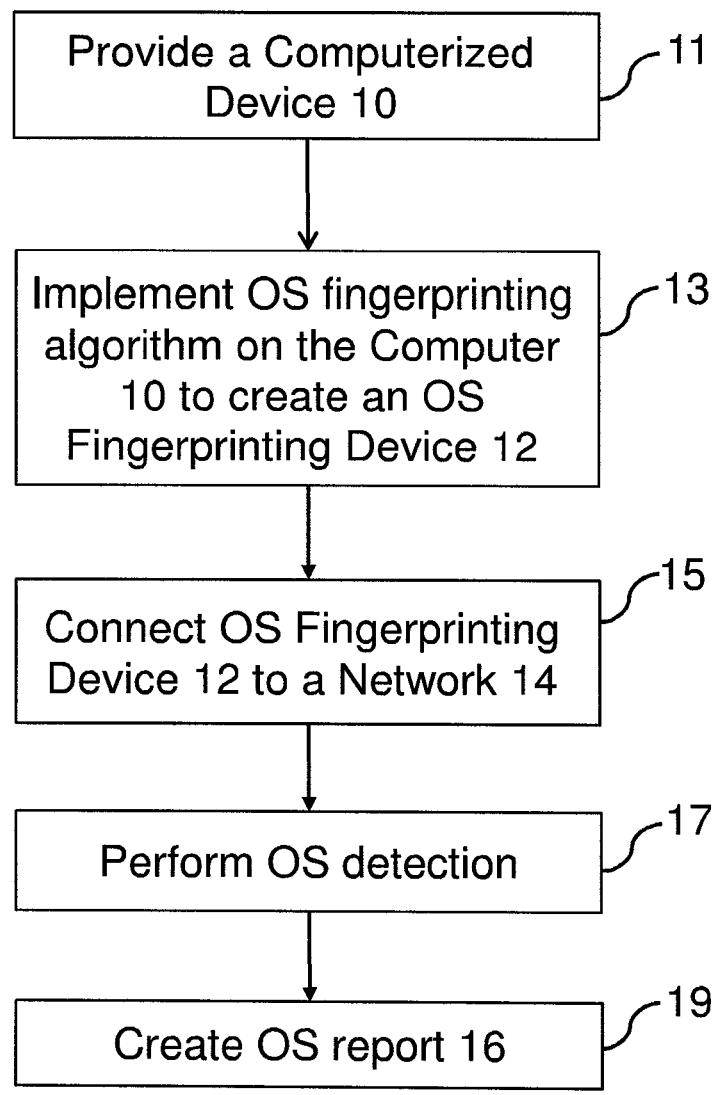
FIG. 1 shows a block diagram of a general method for performing operating system identification, according to an exemplary embodiment.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

For clarity, non-essential elements were omitted from some of the drawings.

A typical requirement for performing operating system (OS) fingerprinting occurs in organizations where a large number of machines (e.g. PCs, printers, etc.) are present, and there is a need to retrieve the operating system of each machine in a short time. It would therefore be advantageous to have a method for performing OS fingerprinting for the entire organization in a very short period of time, such that a person with basic skills at the organization may use the OS fingerprinting method. In this way, there will no longer be a need to employ professional staff at the organization in order to check each machine in the network.

There is therefore a need for an improved method that can provide fast and accurate operating system identification of any IP based IP based network element. It should be noted that in this disclosed subject matter, the terms OS (operating system) fingerprinting and OS identification are equally referring to the process of identifying operating system of a any IP based system.

FIG. 1 shows a block diagram of a general method for performing OS identification (with the direction of arrows indicating the direction of information flow). Initially, a basic "headless" computerized device 10 may be provided 11, the computerized device 10 having standard memory modules (i.e. RAM and FLASH memory). The "headless" computerized device 10 may further have additional features, such as a universal serial bus port (USB), an electrical power input port, a network interface controller (NIC) or a wireless network interface controller (WNIC).

It should be noted that a headless system is a term for a computer system or device that has been configured to operate without a monitor (the missing "head"), keyboard, and mouse. A headless system is typically controlled via a network connection, although some headless system devices require a connection to be made via RS232 or USB port for administration of the device. The use of a headless device is primarily to reduce its cost, and this feature should not be viewed as limiting.

An OS fingerprinting algorithm may then be loaded and implemented 13 onto the computerized device 10 and stored in the memory, thus turning computerized device 10 into an OS fingerprinting device 12. By connecting 15 the OS fingerprinting device 12 to a network 14 in the organization (or to any active network port), it may be possible to communicate with different elements in the network 14 in order to perform OS detection 17. Optionally, the OS fingerprinting device 12 may be connected to the organization continuously or at different intervals according to the requirement of scanning.

Finally, the OS fingerprinting device 12 may create 19 an operating system report 16 after completion of the scan. This report 16 of the detected operating systems may include a detailed report to be treated by professional personnel (e.g. IT administrators) at the organization, such detailed report may include the type of the operating system (e.g. Windows, Linux, etc.) for each element and also the version of each operating system (e.g. Windows 8). Alternatively, the report 16 may include a less detailed report for nonprofessional users (e.g. a manager). Furthermore, the OS report 16 may be accessed by the user from the managing interface of the OS fingerprinting device, or by exporting the report to a computer file (e.g. connecting via a USB port).

Figure 2:
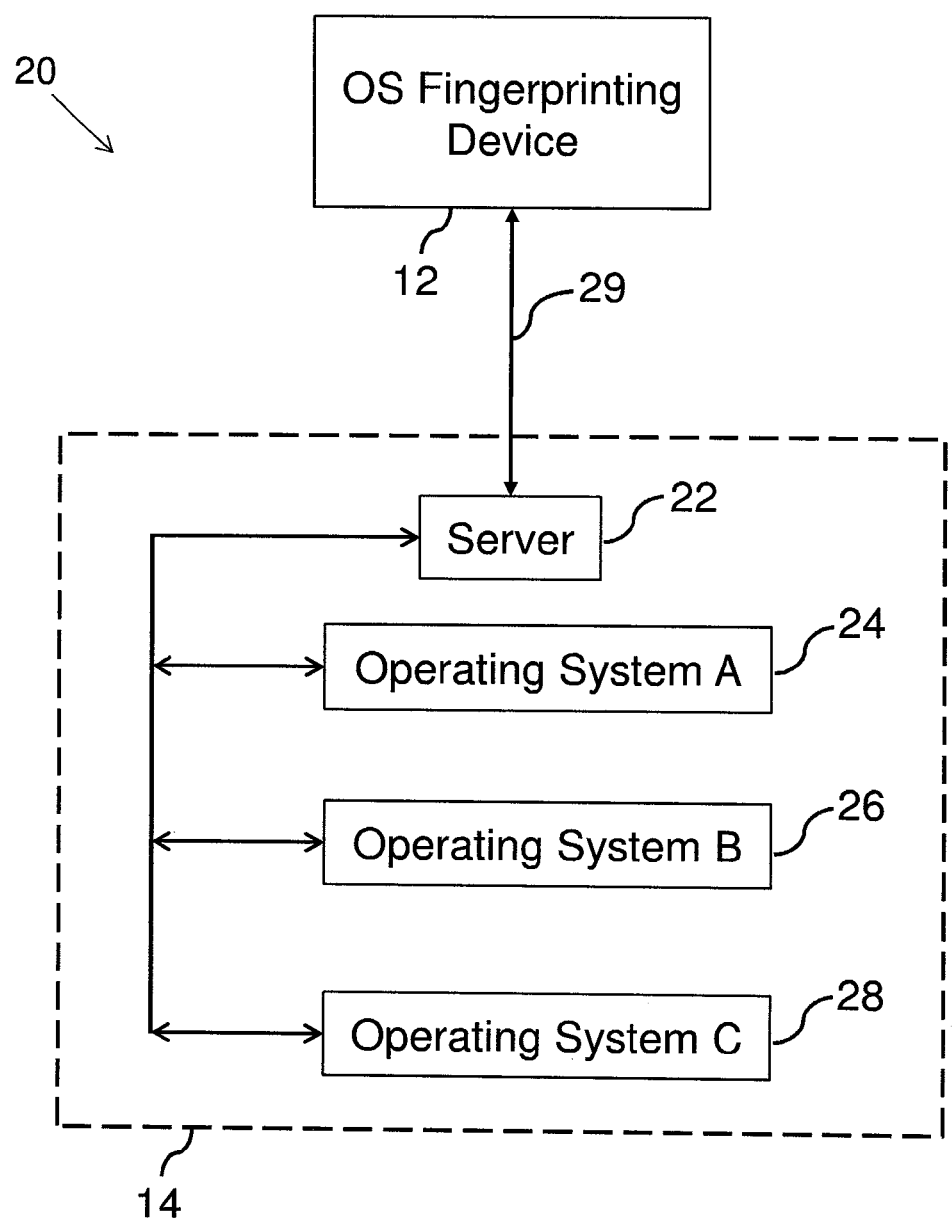
FIG. 2 schematically illustrates a system for operating system fingerprinting, according to an exemplary embodiment.

FIG. 2 schematically illustrates a system for OS fingerprinting 20 (with the direction of arrows indicating the direction of information flow). Once the OS fingerprinting algorithm is implemented onto the computerized device 10 (as shown in FIG. 1), the OS fingerprinting device 12 is connected to a server 22 of the organization through a channel 29, such that it may be possible to communicate with all elements of the network 14. For example, a network of an organization may include a first element 24 having an operating system "A", a second element 26 having an operating system "B", and a third element 28 having an operating system "C". It is therefore required that the OS detection device 21 identifies all operating systems in that network. It should be noted that multiple elements having the same OS may coexist in the organization 14.

In some embodiments, the OS fingerprinting device is utilized to determine the operating system of a single element in the organization.

Figure 3:
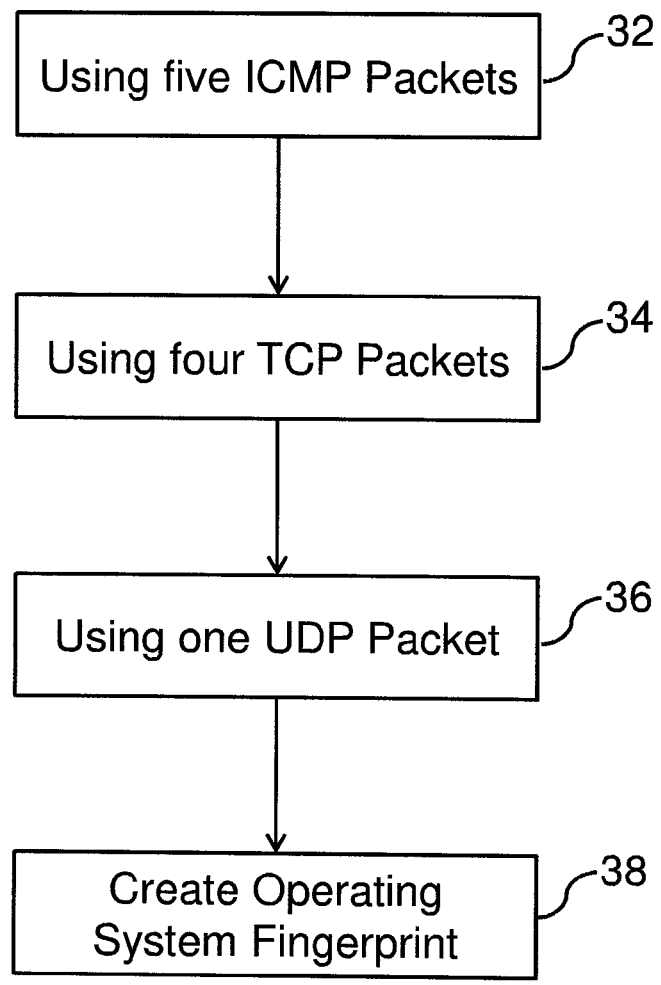
FIG. 3 shows a block diagram of a method for performing improved operating system identification, according to an exemplary embodiment.

FIG. 3 shows a block diagram of a method for performing improved OS identification. For improved detection of an operating system, the method is based on active IP packet fingerprinting with a combination of the following protocols:

a) Internet Control Message Protocol (ICMP) relates to the network layer and assists in identifying signals from the remote IP based network element.

b) Transmission Control Protocol (TCP) relates to the traffic layer and its packets assist in identifying the system using the received responses regarding a scanning session.

c) User Datagram Protocol (UDP) relates to a transport layer defined to provide best-effort datagram service to an IP host.

Preferably, the detection mechanism can identify the operating system using only ten packets that are sent to the remote element in the organization, compared to a typical number of twenty packets required with some commercially available solutions (for instance as provided by the network mapping tool "Nmap", requiring over twenty packets). It should be noted that while the commercially available solutions use a relatively large number of packets (i.e. at least twenty), these solutions often provide erroneous identification of scanned operating systems, thus causing incorrect characterization of the network.

Using a lower number of packets, the communication load on the infrastructure of the organization significantly diminishes such that the system may proceed with normal operations as overload is avoided.

The ICMP, TCP, and UDP protocols are required for identification of the signature of an operating system, wherein the order and sequence of packets sent with these protocols is critical for analyzing an accurate signature of the OS. Combining the ICMP, TCP, and UDP protocols also provides avoiding screening mechanisms that block certain packets so that at the end of the process, the OS is identified. Additionally or alternatively, prior to sending a sequence of packets, a port scanning may be performed in order to determine which ports of the plurality of ports of the remote IP based network element are open and which ports are closed In some exemplary embodiments a sequence of ten packets may be sent to the remote IP based network element in the following order:

1. A first packet may be a standard ICMP ping packet used for testing the reachability of the host in the network; checking time to live (TTL) and type of service (ToS) arguments; verifying several flags of the packet a combination thereof, or the like.
2. A second packet may be a nonstandard ICMP ping packet. The nonstandard ICMP ping packet differ from a standard packets, as follows:
   2.1. Changing the code so that it is no longer be a standard zero, as originally defined.
   2.2. Turning on the flag "Do not Fragment" (DF), that is typically closed by default.
   2.3. Changing the values of the default ToS to a random value.
3. A third packet may be an ICMP standard time stamp packet utilized for testing the received response.
4. A forth packet may be an ICMP standard information request packet.
5. A fifth packet is an ICMP address mask request packet utilized for receiving a response.
6. A sixth packet may be a TCP packet comprising one or more TCP option and a synchronization flag. The packet may address an open port of the remote IP based network element.
7. A seventh packet may be a TCP packet comprising one or more TCP option, and acknowledge plus push flags. The packet may address an open port of the remote IP based network element.

8. An eighth packet may be a TCP packet comprising one or more TCP option and a finished flag. The packet may address an open port of the remote IP based network element.
9. A ninth packet may be a TCP packet comprising one or more TCP option and a finished and acknowledge flags. The packet may address a closed port of the remote IP based network element.
10. A tenth packet is a nonstandard UDP packet addressing port zero Finally, one UDP packet is sent 36 to receive a final reply. This packet is intentionally sent to a closed port zero, since it is not a legitimate reference, with the intention of getting an error message out of the ICMP.

Since each operating system gives a different error message when prompted in such a way, it is finally possible to identify the fingerprint of the operating system 38. Thus, using only ten packets, enabled with a specific combination of ICMP, TCP, and UDP, is sufficient for the identifying of a unique signature for each operating system.

Typically, each packet of any sequence of packets sent to the remote IP based network element may cause a reply of packets to the OS fingerprinting device. Likewise, the remote IP based network element may respond to, the OS fingerprinting devices', sequence of ten packets with reply-packets. In some exemplary embodiments, the OS fingerprinting algorithm may be utilized to analyze the reply-packets in order to determine a signature of the IP based network element. Furthermore, the OS fingerprinting algorithm may be adopted to compare the signature with documented signatures of existing and known OS, thus identifying the OS of the remote IP based network element. In some exemplary embodiments, the OS fingerprinting device may utilize a data repository comprising the documented signatures of all known operating systems. In addition the OS fingerprinting device may be able to update the data repository with new signatures as well as variations of existing signatures similar to a typical learning machine mechanism.

It should be appreciated that in some exemplary embodiments, the OS fingerprinting device may be utilized to identify a plurality of remote IP based network elements simultaneously.

In the abovementioned method, some of the packets are not built according to the requests for command (RFC) standard are labeled "nonstandard packets" vs. standard packets that do comply with RFC. Therefore, the answers obtained with such methods may provide accurate and faster detection of the operating system. In a typical example, the OS fingerprinting method may identify the OS in substantially ten seconds while commercially available solutions require about one minute.

It should be noted that the tests in the abovementioned method are completely independent and may be carried out in any other order so as to successfully identify the nature of the remote operating system. In some embodiments, it is possible to successfully identify the remote OS even if some of these tests are unsuccessful.

Optionally, values from the header of TCP (e.g. flags, different options, window sizes, ACK numbers) which are also originally used for identification purposes may be used to optimize the network communication.

In some embodiments, the number of sent packets may be higher than ten, while still lower than twenty packets as currently required in commercially available solutions, in order to further refine the OS fingerprinting process. In some embodiments, additional protocols may be utilized in the OS fingerprinting process.

In a further embodiment, a virtual machine may be utilized instead of the OS fingerprinting device. Firstly, a virtual machine with an embedded OS fingerprinting algorithm may be provided by the manufacturer (and for instance saved on a private cloud). The virtual machine may then be implemented onto the network of the organization, with the user defining settings similarly to the OS fingerprinting device. Finally, the virtual machine may commence performing the OS detection on the network, and creating a report (similarly to the OS fingerprinting device).

In a further embodiment, the automated OS fingerprinting solution (with the OS fingerprinting device or with the virtual machine) may be employed by closed networks that are not connected to the internet (for instance army intelligence network) in order to detect operating systems.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method of remotely identifying an operating system of a remote network element, wherein the remote network element has a plurality of ports and an Internet connection, the method comprising:
   scanning the ports of the remote network element for determining which ports are open of the plurality of ports;
   sending, by a processor, a sequence of packets to the remote network element over the internet, and wherein packets in the sequence of packets are different from one another;
   receiving reply-packets from the remote network element, wherein the reply-packets are the reply of the remote network element to the packets, and analyzing a signature of the reply-packets, wherein the sequence of packets and the reply packets are selected from the group consisting of internet control message protocol (ICMP), transmission control protocol (TCP), and user datagram protocol (UDP), and wherein the sequence of packets comprises:
   a first packet that is a standard ICMP ping packet;
   a second packet that is a nonstandard ICMP ping packet comprising a nonzero code, a don't fragment flag, and a random type of service value;
   a third packet that is an ICMP standard time-stamp packet;
   a fourth packet that is an ICMP standard information-request packet;
   a fifth packet that is an ICMP address-mask request packet;
   a sixth packet that is a TCP packet comprising at least one option, and a synchronization (SYN) flag, wherein the sixth packet is addressed to an open port of the remote network element;
   a seventh packet that is a TCP packet comprising at least one option, and an acknowledge (ACK) plus push (PSH) flags, wherein the seventh packet is addressed to an open port of the remote network element;

an eighth packet that is a TCP packet comprising at least one option and a finished (FIN) flag, wherein the eighth packet is addressed to a closed port of the remote network element;

a ninth packet that is a TCP packet comprising at least one option and a FIN plus ACK flags, wherein the ninth packet is addressed to a closed port of the remote network element; and a tenth packet that is an UDP packet addressing port zero; and identifying the operating system of the remote network element by comparing the signature with documented signatures of existing operating systems.

2. The method of claim 1, wherein the documented signatures of existing operating systems are stored in a data repository.

3. The method of claim 1, wherein said sending the sequence of packets is sending the sequence of packets to a plurality of remote network elements in parallel.

4. The method of claim 1, wherein said receiving the reply-packets is receiving the reply-packets from a plurality of remote network elements in parallel.

5. The method of claim 1, wherein said identifying the operating system of the remote network element further comprises identifying the version of the operating system.

6. The method of claim 1, wherein the network element is selected from the group consisting of computers smart phones, laptops, handheld computers, printers, and electronic device consisting devices each comprising a software operating system.

\* \* \* \* \*